United States Patent Office 3,048,967
Patented Aug. 14, 1962

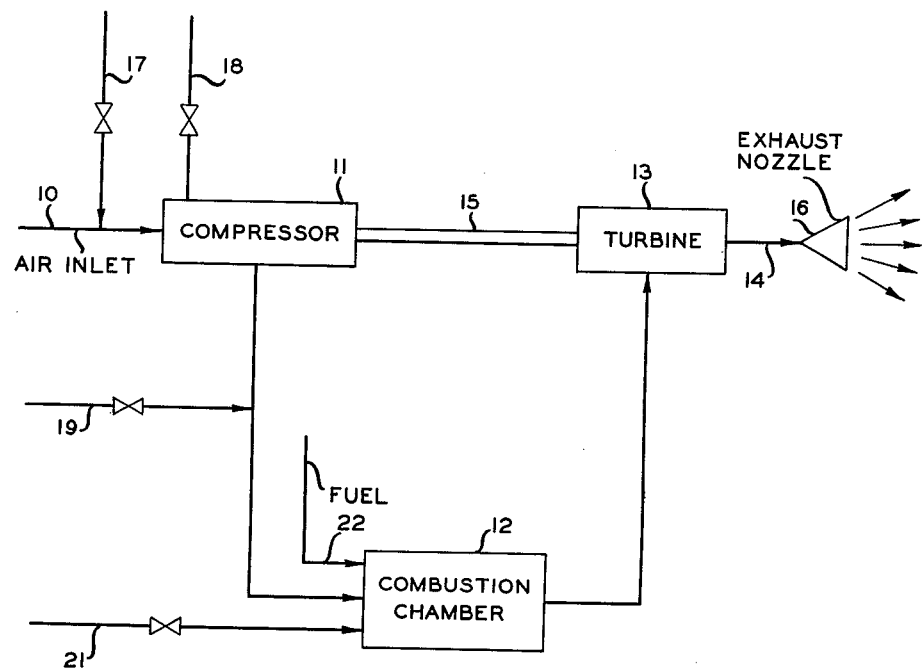
INVENTOR.
D.E. CARR

3,048,967
SMOKE SUPPRESSION AND THRUST AUGMENTATION BY A MIXTURE OF TERTIARY BUTYL ALCOHOL AND WATER
Donald E. Carr, Bartlesville, Okla., assignor to Phillips Petroleum Company, a corporation of Delaware
Filed Nov. 3, 1959, Ser. No. 850,637
12 Claims. (Cl. 60—35.4)

This invention relates to the operation of continuous combustion type power plants. In one aspect this invention relates to the operation of jet engines. In another aspect this invention relates to reduction of the smoke density of exhaust gases from a jet engine. In still another aspect this invention relates to the augmentation of thrust in jet engines.

In recent years jet engines have been employed in increasingly large numbers for the purpose of propelling aircraft, particularly military aircraft, and have been found to be highly advantageous in high speed aircraft. In the last few years, said jet engines have been employed in propelling commercial aircraft. With the increase in use of such engines, however, a number of operational problems have been recognized.

Aircraft jet engines can be classified broadly into three general categories or types; turbo engines, e.g., turbo-jet and turbo-prop; ram jet; and pulse jet. The present invention is primarily applicable to the aircraft turbo engines, and is particularly applicable to turbo-jet engines. For this reason and for the sake of brevity the invention will be described herein primarily as applied to a turbo-jet engine.

A conventional turbo-jet engine comprises three main parts or sections. One of those sections is the compressor section. In the compressor section, kinetic energy is imparted to the air stream and is transformed in a diffuser into potential energy as measured by an increase in static pressure in the compressor. Said compressor can be either an axial or a centrifugal compressor. The second part or section, a combustor, is provided to receive compressed air and fuel which is burned therein to increase the temperature of said air and resulting combustion gases within the combustor. Said combustor can be any one of the conventional types, as for example, one that employs multiple combustion chambers ("cans") or one that employs an annular combustion tube or chamber. In the can type, the air flow is split upon leaving the compressor section and equal portions are sent to each can, where said portions are combusted with portions of the fuel. The combustion products are then recombined with secondary air and routed to the turbine section. In the annular type of combustion chamber the primary portion of the air is diverted from the main stream and directed toward the fuel injector within said combustion chamber where it burns with the fuel. The remaining or secondary air is then mixed with the products of combustion at a point downstream from the point of introduction of said primary air. The third main part of the engine, the turbine section, is ordinarily provided downstream of the combustor section and receives combustion gases from the combustion chamber. The gas turbine unit in the turbine section receives the gases from the combustor and 80–90 percent of the power developed by said turbine is employed to drive said compressor and the various auxiliaries of the engine. The remaining power, together with the gases exhausted from said turbine, is available to propel the aircraft. Thus, forward thrust for the turbo-jet engine is provided by the high velocity jet of gases which emerges from the turbine. In a turbo-prop engine, said remaining power not utilized to drive the compressor and various auxiliaries, is transmitted to and drives a propeller.

Performance of a turbo-jet engine is dependent to a large extent upon the "temperature rise" which is obtainable in the engine. "Temperature rise" is that increase in temperature between the inlet to the combustor and the temperature of the gases at the combustor exhaust outlet. The temperature rise must be carefully controlled, however, for the operation of a turbo-jet engine is limited by the ability of the turbine blades to withstand high temperatures. Fuel which is supplied to the combustor is burned in the presence of supplied air and raises the temperature of the combustion gases and unused air by the heat of combustion. An excess of air is conventionally utilized to control the temperature of the gases contacting the turbine blades. The hot gases are expanded through the turbine section which provides power for the compressor as mentioned above. Further expansion takes place in a rearwardly extending exhaust nozzle to provide a substantial increase in gas velocity. The thrust which is provided by the engine equals the gas mass flow to the exhaust duct times its increase in speed according to the law of momentum.

As mentioned above, the temperature rise which is obtained in the engine must be carefully controlled and is limited by the ability of the turbine blades to withstand high temperatures. This enforced control of temperature rise creates operational problems, particularly at takeoff under high load, and during emergency conditions in flight when an abnormally large increase in developed thrust is necessary. Generally speaking, approximately fifty percent more power or thrust is required at takeoff than is required under normal cruising conditions. This large amount of thrust required at takeoff, and the necessity for providing extra power or thrust for emergency conditions which occur in flight, has presented serious problems for engine designers and manufacturers. Obviously the greater load which can be lifted at takeoff renders operation of the aircraft more profitable in commercial operations and more effective in military operations. Just as obvious, however, there is a point of economic balance as well as weight balance. In general, it is not economical or practical to equip an aircraft with excessively large engines, or an excessive number of engines, in order to be able to lift maximum load at takeoff and then employ a reduced number of said engines, or only about fifty to sixty percent of the available power of the engine, at cruising speed.

To overcome this problem present day turbo-jet engines have been designed to operate with the injection of a power augmentation or thrust augmentation liquid at takeoff, and in emergency conditions which may develop in flight. These thrust augmentation liquids serve to lower the temperature of the gases exhausted from the combustion chamber before said gases enter the turbine section and thus make it possible to burn more fuel without exceeding a maximum temperature for said exhaust gases. Thrust augmentation liquids such as water, and mixtures of methyl alcohol or ethyl alcohol with water, are conventionally injected into the compressor inlet or into the combustion chamber of a jet engine. The use of isopropyl alcohol-water mixtures as thrust augmentation liquids has been suggested. Said thrust augmentation liquids can be injected into the air inlet upstream of the compressor, into the compressor itself, into the diffuser downstream of the compressor and upstream of the combustion chamber, or directly into the combustion chamber. As discussed hereinafter, it is usually preferred to inject the thrust augmentation liquid directly into the compressor. Regardless of the point of injection, said liquids by being vaporized extract heat and thus act to cool the gases entering the turbine section, thereby permitting more fuel than normal to be burned within the combustion section without exceeding the maximum temperature limits which can be tolerated within said turbine section. It has been found that a 24 percent increase in thrust can be realized with water injection in a centrifugal machine, but the increase is obtained at a very high specific liquid consumption. Water-alcohol injection tests on an axial flow compressor turbojet have shown an increase of 12–16 percent in thrust. The higher value was obtained with water injection at the compressor inlet, the lower value was obtained with water and alcohol injected into the combustion chamber.

While the prior art use of water and said alcohol-water mixtures, such as ethyl alcohol-water mixtures, augments the thrust developed by the engine, the use of such liquids has created other problems and leaves much to be desired. The use of said alcohol-water mixtures results in excessive smoke and a general combustion dirtiness. The problem of increased smoke in the exhaust gases, measured as an increase in smoke density, is serious; particularly in those localities afflicted with smog problems or fog problems. Indeed, the problem has become so severe in some localities that local authorities have required that the smoke density be lowered to acceptable values or the operation of the jet aircraft be suspended. Furthermore, not only is a nuisance created insofar as the locality immediately surrounding the airport is concerned, the thick clouds of smoke which are ejected are a hazard to operation of the airport itself and to other planes operating in and out of the airport. Thus the problem of excessive smoke in the exhaust gases has become more critical and of more importance than the problem of thrust augmentation.

Solving the problem of thrust augmentation is of little or no value from a practical standpoint if in solving said problem there is created or left unsolved another more critical problem. This is what has happened in the prior art. Water alone was an early thrust augmentation liquid. As is well known, water serves very well to augment thrust but it also greatly increases the amount of smoke in the engine exhaust gases. The water-alcohol thrust augmentation mixtures (using the above mentioned prior art normal and iso alcohols) are only slightly better than water alone with respect to the amount of smoke in the engine exhaust gases. Jet engine manufacturers, aircraft manufacturers, and fuel manufacturers are all searching diligently for some means for reducing the amount of smoke in the engine exhaust gases.

I have now found that a tertiary alcohol, specifically tertiary butanol, when mixed with water not only forms a good thrust augmentation liquid but is also an excellent smoke suppression agent in that it very markedly reduces the amount of smoke in the engine exhaust gases. This was surprising and unexpected in view of the fact that said prior art alcohol-water thrust augmentation liquids (using normal and iso alcohols) are only slightly better than water alone with respect to the amount of smoke in the engine exhaust gases.

Thus, tertiary butanol-water mixtures accomplish at least two improvements in the operation of jet engines; said mixtures (1) act as coolant for the gases exhausted from the combustion chamber and thus augment thrust by permitting more fuel to be burned in said combustion chamber; and (2) decrease the smoke density of the gases exhausted from the engine.

Thus, broadly speaking, my invention resides in a method of operation of an aircraft turbo engine which method comprises introducing an aqueous mixture comprising water and tertiary butanol into a combustion zone of said engine.

By the term thrust augmentation, augmentation of thrust, or to increase thrust, or the like, there is meant an increase in thrust obtained from use of a supplementary or auxiliary apparatus or operation over the thrust obtained without use of such supplementary or auxiliary apparatus or operation.

By the term specific thrust is meant the pounds of force exerted on the craft per pound of air used in the combustion of the fuel.

An object of the invention is to provide an improved method of operating an aircraft turbo engine. Another object of the invention is to provide a method for reducing the smoke density of the gases exhausted from an aircraft turbo engine. Another object of the invention is to provide a method for augmenting the thrust developed by an aircraft turbo engine by introducing a thrust augmentation liquid comprising tertiary butanol and water into a combustion zone of said engine. Still another object of the invention is to provide an improved smoke suppressing and thrust augmentation mixture for use in aircraft turbo engines. Other aspects, objects and advantages of the invention will be apparent to those skilled in the art in view of this disclosure.

Thus, according to the invention there is provided a method of operating an aircraft turbo engine, which method comprises: the step of introducing into a combustion zone of an aircraft turbo engine an aqueous mixture comprising from 10 to 50 volume percent of tertiary butanol and from 90 to 50 volume percent of water.

The invention will be further described as applied to turbo-jet aircraft. However, it is to be understood that the invention has application to any type of aircraft turbo engine such as turbo-jet, turbo-prop, or turbo-prop-jet.

The attached drawing is a diagrammatic illustration of the functional portions of a turbo-jet engine.

The tertiary butanol of the invention is used in admixture with water. The aqueous solution ordinarily can contain from about 10 to about 50 volume percent of tertiary butanol, preferably 15 to 35 volume percent, based on the total mixture.

In the practice of the invention, the smoke suppressing and thrust augmentation liquid (coolant) can be injected into (a) the air inlet to the compressor, (b) directly into the compressor, (c) the diffuser, i.e., downstream of the compressor and upstream of the combustion chamber, (d) or directly into the combustion chamber. Of these possible points of injection, injection into the inlet of the compressor is usually the least preferred because injection at this point reduces the capacity of the compressor. Injection directly into the compressor is the most preferred point of injection. When injected into the compressor, said smoke suppressing and thrust augmentation liquid is introduced at some intermediate stage of compression, preferably at a point where favorable intercooling occurs. Introduction directly into the compressor is preferred because when so injected said liquid cools the air as it is being compressed and thus acts as an intercooler in said compressor, greatly increasing the capacity of said compressor. As will be understood by those skilled in the art, an increase in the capacity of the compressor will ultimately result in more available thrust from the engine because more air, at a lower temperature, is available to permit the burning of more fuel in the combustion chamber.

The advantages of the invention can also be realized by injection of the smoke suppressing and thrust augmentation liquid into the diffuser downstream of the compressor or directly into the combustion chamber because introduction at these two points will also result in cooler exhaust gases from said combustion chamber for introduction into the turbine section. However, since the smoke suppressing and thrust augmentation liquid is introduced downstream of the compressor, the advantage of the increased capacity of the compressor as discussed above is sacrificed. For these reasons, the latter two points of introduction are less preferred than injection of said liquid directly into the compressor.

Regardless of the place of injection of the smoke suppressing and thrust augmentation liquid, said liquid is ultimately introduced into the combustion chamber, the exhaust gases from said combustion chamber are cooled; and the smoke density of said exhaust gases is caused to be decreased. In the practice of the invention said liquid is introduced into said combustion chamber in an amount sufficient to appreciably augment the thrust of the engine and sufficient to appreciably reduce the smoke density of the exhaust gases from said engine. The actual amount of said liquid introduced into said combustion chamber will vary depending upon the design of the specific engine, operating conditions such as the altitude at which the engine is operating, the length of runway available, the load carried by the aircraft the engine is propelling, and other factors as will be understood by those skilled in the art. Therefore the invention is not limited to the introduction of any specific amount of the smoke suppressing and thrust augmentation liquids (coolants) of the invention. Said liquid (coolant) is usually introduced in an amount sufficient to give a coolant to air weight ratio within the range of about 0.001 to about 0.15. In many instances it is preferred that said ratio be in the range of about 0.001 to about 0.10 or lower such as from 0.001 to about 0.07. However, with some engines under some conditions said ratio can go as high as 0.2 or higher. When said liquid (coolant) is introduced directly into the primary combustion portion of the combustion chamber it is preferably introduced in an amount sufficient to give a coolant to air weight ratio within the lower portion of said range, e.g., from about 0.001 to about 0.10. It is within the scope of the invention to inject a portion of said liquid into the primary portion of the combustion chamber and another portion into the secondary portion of said combustion chamber. Thus, a suitable overall range of injected smoke suppressing and thrust augmentation liquid is an amount sufficient to give a smoke suppressing and thrust augmentation liquid to air ratio within the range of about 0.001 to about 0.2.

Referring now to said drawing, the invention will be more fully explained. Since the operating cycle and the elements of a conventional turbo-jet engine are well known to those skilled in the art, the functional parts of a turbo-jet engine have been illustrated diagrammatically. In said drawing, there is illustrated a compressor means 11 having an air inlet means 10 for the introduction of air into said compressor means. In said compressor means the air is usually compressed to a pressure within the range of about 4 to 12 atmospheres. From the compressor, the compressed air flows into combustion section 12 where it is combined with a metered, and atomized or prevaporized, amount of fuel introduced via conduit 22 and its temperature increased by combustion of said fuel. From said combustion section 12 the exhaust gases with their combustion products and excess air flow to turbine 13 which may contain one or more turbine rotors and one or more stages. Said gases entering said turbine section cause the turbine rotor or rotors to revolve and to drive the compressor in said compression section by means of shaft means 15 which connects the compressor in said compression section and the turbine in said turbine section. The gases exhausted from said turbine section then flow through tail pipe section 14 and are vented to the atmosphere through exhaust nozzle 16.

In the practice of the invention, the smoke suppressing and thrust augmentation liquid (coolant) comprising tertiary butanol and water can be introduced into the inlet of the compression section 11 by means of conduit 17; directly into the compressor in said compression section by means of conduit 18; into the diffuser downstream of said compression section and upstream of said combustion section 12 by means of conduit 19; or directly into said combustion section 12 by means of conduit 21. Any suitable conduit means and injection means can be employed for injecting the tertiary butanol-water mixtures at the above mentioned places.

The following example will serve to further illustrate the invention.

EXAMPLE

A series of test runs was carried out in a 2-inch diameter fuel atomizing combustor embodying features common to full scale turbo-jet combustion systems. Said combustor comprises a perforated flame tube closed at its upstream end and mounted within an outer shell to provide an annular air flow space between said flame tube and said shell. Said annular air flow space is closed at its downstream end so as to cause air to enter said flame tube through said perforations. The ratio of primary combustion air to secondary quench or diluent air is about 1 to 4, based on the area of the perforations in the upstream and downstream portions of said flame tube. Fuel is injected into said flame tube through an atomizing nozzle axially positioned in the upstream end thereof. Some air is admitted around the fuel spray nozzle in a swirling pattern to assist atomization of the fuel.

In said series of test runs the primary fuel used was a JP-4 referee fuel having the properties set forth in Table I below. In said test runs the various liquids (coolants) to be tested were injected at various coolant to air weight ratios into the air stream downstream from the compressor and upstream from said combustor a sufficient distance to permit complete vaporization of said liquid prior to entry into said combustor.

Average operating conditions of the combustor during each of said test runs were as follows:

Inlet air pressure _____ 300 inches Hg Abs.
Inlet air velocity _____ 100 feet per second.
Inlet air temperature _____ 600° F.
Exhaust gas temperature _____ 1300° F.

Said exhaust gas temperature was maintained essentially constant at 1300° F. for each test run by varying the fuel to air weight ratio within the limits of about 0.010 to about 0.02 to compensate for the amount of coolant injected.

During said test runs the amount of smoke in the combustor exhaust gases was determined by measuring the smoke density of said gases. The results of these measurements are shown in Table II below. Said smoke density measurements were made with an E.K. Von Brand continuous gas sampling and filtering recorder. The filter paper strips from said Von Brand recorder were evaluated with a Welch Densichron reflection head densitometer which rated said strips between 0 and 100 percent according to "blackness."

Some of the properties of the JP-4 referee fuel used as the primary fuel in the above described test runs are given in Table I below. Said fuel conformed with JP-4 specifications in every respect.

*Table I*

PROPERTIES OF JP-4 REFEREE FUEL

| | |
|---|---|
| API gravity | 49.0 |
| ASTM Distillation, ° F.: | |
|   IBP | 141 |
|   10% | 224 |
|   50% | 376 |
|   90% | 465 |
|   EP | 514 |
| Paraffins+Naphthenes—LV percent | 78.1 |
| Aromatics—LV percent | 19.6 |
| Olefins—LV percent | 2.3 |

Table II
EFFECTIVENESS OF COOLANTS IN REDUCING SMOKE DENSITY

| Fuel | Coolant to Air-Wt. Ratio | Smoke density for water alone minus the smoke density for various aqueous coolant mixtures percent | | |
|---|---|---|---|---|
| | | 75 LV Percent Water, 25 LV Percent Ethanol | 75 LV Percent Water, 25 LV Percent i-Propanol | 75 LV Percent Water, 25 LV Percent t-Butanol |
| JP-4 Referee | 0.02 | 3 | 9 | 22 |
| Do | 0.04 | 4 | 9 | 37 |
| Do | 0.06 | 5 | 15 | 39 |

The above data show the superiority of tertiary butanol-water mixture with respect to smoke density of the engine exhaust gases. Examination of said data shows for example that when using the JP–4 referee fuel and a coolant to air weight ratio of 0.04 the amount of smoke in the combustor exhaust gases was (a) only 4 percent less when using the ethanol-water mixture than when using water alone, (b) only 9 percent less when using the isopropanol-water mixture, whereas (c) it was a surprising 37 percent less when using the tertiary butanol-water mixture than when using water alone. Similar comparisons for the results obtained with 0.02 and 0.06 coolant to air ratios likewise show the unexpected superiority of the tertiary butanol—water mixture over water alone.

The problem of excessive smoke in the engine exhaust gases is less severe when using a maximum quality fuel such as the normal paraffins, for example n-heptane. Economics prevents commercial use of such fuels. However, even when using such maximum quality fuels, it has bene found that the smoke suppressing and thrust augmentation liquids of the invention effect a very marked and significant reduction in the amount of smoke in the combustor exhaust gases.

Any suitable type of hydrocarbon fuel can be employed in the practice of the invention. Said fuels which can be so employed include the conventional jet engine fuels which comprise a blend of hydrocarbons boiling in the range from about 100 to about 700° F., such as gas oils, kerosene, and gasolines, including aviation gasoline. Fuels of the paraffin and naphthenic type having relatively low aromatic content, i.e., not more than about 20 liquid volume percent aromatics, as well as fuels of the aromatic type having high aromatic contents ranging from about 20 up to about 88 percent or higher liquid volume percent aromatics, can be used in operating continuous combustion turbo type aircraft engines according to the practice of the invention. Hydrocarbon fuels having wide boiling range, such as JP-3, JP-4, or fuels of the kerosene type, such as JP-5, can be employed, the boiling range of these fuels generally being in the range of about 200 to about 600° F.

Hydrocarbon fuel and air are injected into the combustion zone of jet engines at a fuel to air weight ratio between 0.005 to 0.10. Turbo-jet engines are preferably operated on an overall fuel to air weight ratio between 0.01 and 0.03. In the practice of this invention, hydrocarbon fuel and air are injected into the combustion zone of the engine at a fuel to air weight ratio between 0.005 to 0.10. The exact fuel to air ratio which is utilized will depend upon engine design limitations, such as turbine durability and the like, as will be understood by those skilled in the art. The air supplied to the turbo-jet engine will generally have an air inlet pressure between about 40 and about 500 inches of mercury absolute and will have a linear air velocity of from about 30 to about 200 feet per second. The fuel supply to the combustor will have a temperature of between about −60° F. and about 350° F. The air is usually supplied to the combustor at a temperature between about −30° F. and about 900° F., more frequently between 100° F. and 760° F. Fuel injection temperature will be dependent upon fuel characteristics such as freezing point and volatility as well as injection nozzle characteristics.

When a turbojet engine is developing its maximum rated thrust with normal operation, it is operating with a maximum allowable turbine inlet temperature and maximum rotor speed. Since the rotor speed determines the pressure ratio of the compressor, the compressor is thus operating with its maximum pressure ratio. Consequently, means for augmenting the thrust of the engine must be based upon means which do not increase the turbine inlet temperature or the compression ratio.

The thrust developed by a turbojet engine is a function of the mass rate of flow of air and fuel and of the difference between the velocity of the jet and the craft being propelled thereby, as indicated by the following formula:

$$\text{Thrust} = \frac{G}{g}(V_j - V)$$

in which $G$=mass rate of flow of air and fuel, as in pounds per second; $g$=the acceleration due to gravity in feet per second; $V_j$=velocity of the jet in feet per second and $V$=the velocity of the craft, also in feet per second. For a given flight speed, $V$, the thrust of the engine can be increased by increasing $V_j$, the velocity of the jet, or by increasing $G$, the mass rate of flow of the air and fuel, or both $V_j$ and $G$.

With the use of the tertiary butanol-water mixtures of the invention, the value of $G$ for a given turbine inlet temperature is increased, thereby increasing engine thrust, and the amount of smoke in the engine exhaust gases is markedly reduced.

The following gives exemplary operating conditions of the apparatus of the drawing from the air inlet to the exhaust nozzle:

| | Compressor Inlet | Compressor Outlet | Combustion Chamber Outlet |
|---|---|---|---|
| Pressure | 1 atmosphere | 12 atmospheres | 11.5 atmospheres. |
| Temperature | 520° R | 1,100° R | X. |
| Mass of air | 1 pound | 1 pound | |

The temperature of the gases leaving the combustion chamber will, of course, vary with the fuel composition, e.g., with the proportion of tertiary butanol in the tertiary butanol-water mixture. The greater the tertiary butanol content the higher is the combustion temperature.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:
1. In the method of operating an aircraft turbo engine wherein air and a liquid hydrocarbon fuel are introduced into and burned in a combustion zone of said engine and resulting gases are exhausted from said engine so as to impart thrust thereto, the step of also introducing into said combustion zone an aqueous mixture comprising from 10 to 50 volume percent of tertiary butanol and from 90 to 50 volume percent of water.

2. In the method of operating a turbo aircraft engine wherein air is introduced into and compressed in a compressor, the resulting compressed air is introduced into a combustion chamber of said engine, a liquid hydrocarbon fuel is introduced into said combustion chamber and burned with a portion of said air to form a mixture of combustion gases and air, said mixture is exhausted from said combustion chamber through a turbine and out of a rearwardly extending exhaust duct to impart thrust to said engine, the improvement which comprises introducing into said combustion chamber as a smoke suppressing and thrust augmentation liquid an aqueous mixture comprising from 10 to 50 volume percent of tertiary butanol and from 90 to 50 volume percent of water.

3. The method of claim 2 wherein said aqueous mixture is injected into the inlet of said compressor, along with said air, and passes to said combustion chamber along with said air.

4. The method of claim 2 wherein said aqueous mixture is injected into an intermediate stage of said compressor and passes to said combustion chamber along with said air.

5. The method of claim 2 wherein said aqueous mixture is injected into said compressed air stream downstream from but upstream of said combustion chamber and passes to said combustion chamber along with said air.

6. The method of claim 2 wherein said aqueous mixture is injected directly into said combustion chamber.

7. In the operation of a turbo aircraft engine wherein a liquid hydrocarbon fuel and air are burned in a combustion zone of said engine, a thrust augmentation liquid is introduced into said combustion zone, and resulting gases are exhausted from said engine so as to impart thrust thereto, the method of reducing the smoke density of said exhaust gases which comprises introducing into said combustion chamber as a smoke suppressing and thrust augmentation liquid an aqueous mixture comprising from 10 to 50 volume percent of tertiary butanol and from 90 to 50 volume percent of water.

8. The method of claim 2 wherein said aqueous mixture is introduced into said combustion chamber in a smoke suppressing and thrust augmentation liquid to air weight ratio within the range of 0.001 to 0.2.

9. The method of claim 2 wherein said aqueous mixture comprises from 85 to 65 volume percent of water and from 15 to 35 volume percent of tertiary butanol.

10. The method of claim 9 wherein said aqueous mixture is introduced into said combustion chamber in a smoke suppressing and thrust augmentation liquid to air weight ratio within the range of 0.001 to 0.15.

11. The method of claim 9 wherein said aqueous mixture is introduced into said combustion chamber in a smoke suppressing and thrust augmentation liquid to air weight ratio within the range of 0.001 to 0.1.

12. The method of claim 9 wherein said aqueous mixture is introduced into said combustion chamber in a smoke suppressing and thrust augmentation liquid to air weight ratio within the range of 0.001 to 0.07.

References Cited in the file of this patent

UNITED STATES PATENTS

| | | |
|---|---|---|
| 2,662,817 | Russell et al. | Dec. 15, 1953 |
| 2,782,592 | Kolfenbach et al. | Feb. 26, 1957 |
| 2,929,200 | Wasserbach et al. | Mar. 22, 1960 |